Figure 1:
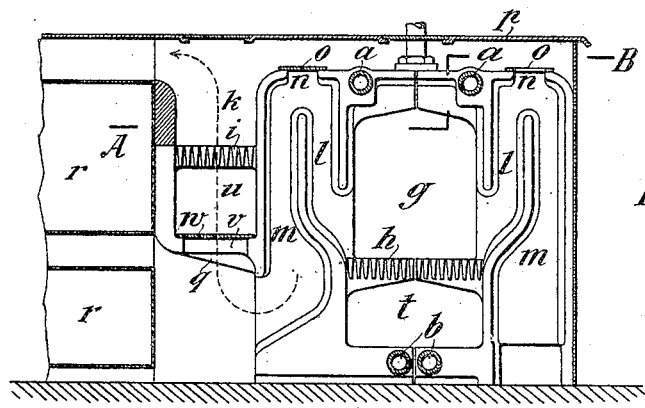

No. 838,782. PATENTED DEC. 18, 1906.
A. HAGE.
SECTIONAL BOILER.
APPLICATION FILED JAN. 15, 1906.

3 SHEETS—SHEET 1.

No. 838,782. PATENTED DEC. 18, 1906.
A. HAGE.
SECTIONAL BOILER.
APPLICATION FILED JAN. 15, 1906.

3 SHEETS—SHEET 2.

Witnesses:
Jacob Schaefer
Geo. C. Poulton

Inventor.
Aloys Hage.
by Herbert W. Jenner.
Attorney

No. 838,782. PATENTED DEC. 18, 1906.
A. HAGE.
SECTIONAL BOILER.
APPLICATION FILED JAN. 15, 1906.
3 SHEETS—SHEET 3.
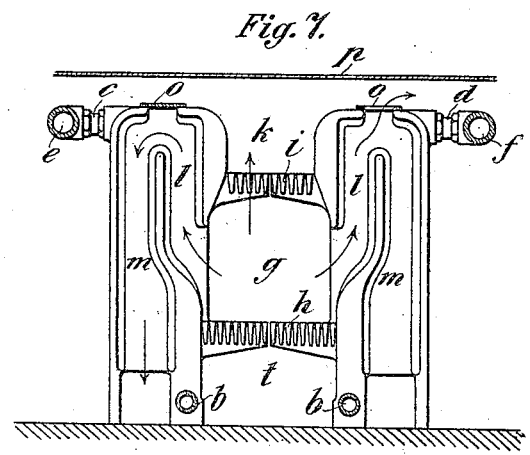

UNITED STATES PATENT OFFICE.

ALOYS HAGE, OF HILDESHEIM, GERMANY.

SECTIONAL BOILER.

No. 838,782.　　　　Specification of Letters Patent.　　　　Patented Dec. 18, 1906.

Application filed January 15, 1906. Serial No. 296,168.

*To all whom it may concern:*

Be it known that I, ALOYS HAGE, residing at Hildesheim, Germany, have invented certain new and useful Improvements in or Relating to Sectional Boilers; and I do hereby declare the following to be a full, clear, and exact description of the invention, such as will enable others skilled in the art to which it appertains to make and use the same.

This invention relates to a sectional boiler for kitchen-ranges and is intended both for large and small houses. It is distinguished by great adaptability to most varied requirements.

Everywhere where the kitchen-range has to be used for heating large quantities of water for rinsing or bath purposes or heating large hot closets for warming up food or crockery or for heating living-rooms it is necessary that the heating body should be capable of adapting itself to these various requirements. Thus it is necessary to provide for the hot water required for rinsing in the kitchen, and also for the water for the bath, and in many cases also for heating hot closets, &c., while in the winter it is also necessary to heat some of the living-rooms.

This device is also intended to make it possible to use it within wide limits for culinary purposes—that is to say, chiefly for cooking food—since, for instance, in large hotels or clubs the demands on the kitchen vary to a great extent.

An apparatus fulfilling the above requirements is the subject of this invention; and it consists of a section-boiler which is built into the range and provided with several furnaces, which can be operated either independently of each other or simultaneously, and the parts of which—walls, grates, ash-pits—are cooled by the contents of the boiler, and at the same time heat the said contents of the boiler, while the said parts are then protected against becoming incandescent. One of these furnaces is considerably larger than the rest and is suitable for heating the whole contents of the boiler, while the other furnaces act only on a comparatively small portion of the heating-surface of the boiler. All the furnaces are, however, arranged in such manner that their combustion-gases can be utilized for heating the range—that is to say, for heating the range-plates and roasting and warming stoves, heating baking-stoves, kettles, and generally for any other purposes.

Another feature of the apparatus according to this invention consists in the fact that when one furnace—for instance, only the large one—is used the parts of the smaller one are also heated—that is to say, act as a heating body—and that for the purpose of regulating the heating action of the flames any desired number of the furnaces could be made to act more or less on the contents of the boiler and correspondingly less or more on the range-plate.

Several constructions of a sectional boiler according to this invention are illustrated in the accompanying drawings, in which—

Figure 2:
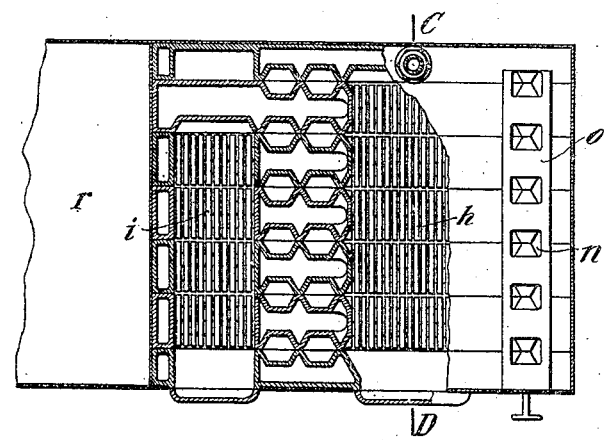
Figure 3:
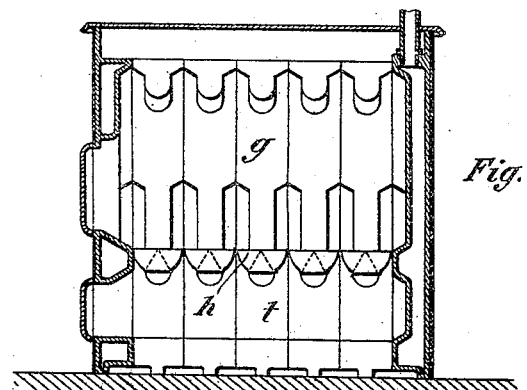
Figure 4:
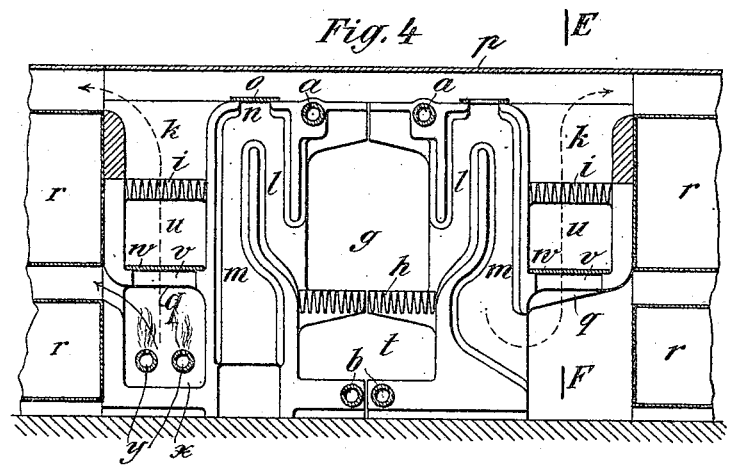
Figure 5:
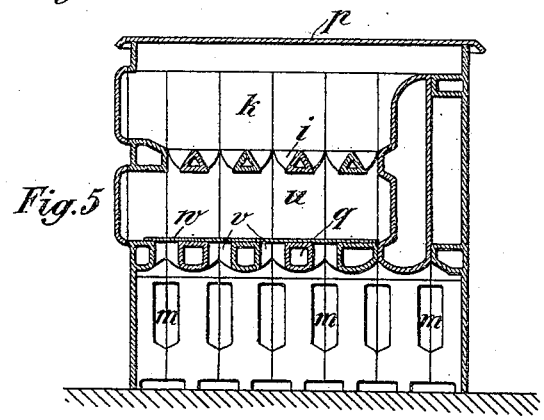
Figure 6:
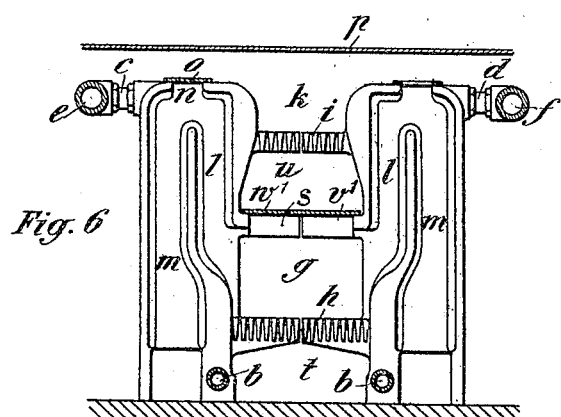

Figure 1 is a vertical section through such a boiler transversely of the furnaces. Fig. 2 same boiler on line A B of Fig. 1. Fig. 3 is a is a horizontal cross-section through the vertical section through the same boiler on line C D of Fig. 2. Fig. 4 is a vertical section through another construction of the sectional boiler. Fig. 5 is a vertical section through the same boiler on line E F of Fig. 4. Fig. 6 is a vertical section through a third construction of the sectional boiler transversely of the furnace, and Fig. 7 is a vertical section through the fourth construction of the sectional boiler transversely of the furnaces. Figs. 1, 2, and 4 show, in addition to the boiler, some other parts of the range—for instance, roasting and warming stoves—the remaining figures not showing any extra parts except the range-plates.

The boiler illustrated in Figs. 1 to 3 consists of partly-similar and partly-dissimilar hollow sections filled with water, arranged side by side, communicating with each other by means of openings $a$ $b$. Single boiler-sections when placed together form, in the well-known manner, a large combustion-chamber $g$, which is closed at the bottom by a grate $h$, through which water circulates. This chamber forms the large furnace, which heats the whole contents of the boiler. The sections also form projections which constitute a second grate $i$ for the small furnace $k$, which is arranged considerably higher close to the range-plate, so that only the upper portion of the contents of the boiler is heated by the same smaller furnace, chiefly by the heating action of the incandescent fuel on the grate.

Under the large grate $h$ is an ash-pit $t$ and under the small grate a similar ash-pit $u$, the said ash-pits also being formed by the hollow projections or parts of the boiler-sections.

The large furnace is closed at the top; but, if desired, it can be open at the top, and thus form a shaft-furnace. Combustion-gases from the large furnace pass into flues $l$ $m$, arranged between the sections, the flues $l$ leading upward from close above the grate and then passing into the downward flues $m$. At the highest point, where the two flues join, are arranged openings $n$, which can be closed by dampers $o$, the combustion-gases passing, when the dampers are open, direct under the range-plate $p$ and acting here with the greatest portion of their heating power. When the openings in question are closed, the combustion-gases go downward and heat further the water contained in the boiler.

In order to utilize further the combustion-gases escaping downward from the flue $m$ for the extra heating of the contents of the boiler, there are arranged between the parts $q$ of the boiler-sections, which form the bottom limit of the ash-pit $u$, slots $v$, which are normally closed by a plate or damper $w$, arranged on the bottom of the ash-pit. By opening the said slots or openings $v$ the combustion-gases escaping from the flues $m$ can follow the path (shown by dotted arrows) through the small furnace—that is to say, through the ash-pit and the grate-bars of the small furnace—so that the gases can give off the remainder of their heat now to the said parts of the furnace.

According to the position of the dampers $o$ it is therefore possible either to utilize the whole heat produced on the grate $h$ for heating the boiler or to convey it to a greater or less extent under the range-plate or the roasting-stove, &c., or to use it on the one side for heating the boiler and on the other side for heating the range-plate or a roasting-stove.

$r$ $r$ are roasting or warming stoves, which can be surrounded and heated by the combustion-gases both from the small and from the large furnace.

The boiler in Fig. 4 is distinguished from the one just described both by the symmetrical arrangement of two smaller furnaces $k$, arranged at the top, one at each side of the boiler, and by the arrangement of a third small furnace $x$ below the furnace on the left-hand side. This latter furnace is a gas-furnace, the space $x$ containing any desired number of burners $y$. The combustion-gases from this furnace normally follow the path indicated by the arrows, (shown in full lines,) while after the removal of the plate $w$ they follow the path indicated by the dotted arrows through the upper small furnace. Such a boiler is suitable for being arranged in the center of a large range, so that its combustion-gases would act to either side.

Fig. 5 is a longitudinal section through the small furnace $k$. It also makes clearer the arrangement of the boiler in Figs. 1 to 3. Fig. 5 also shows the outlet-openings for the downward flues $m$ into the spaces arranged under the small furnaces and communicating with the main flue, as well as the slots $v$ between the section parts $q$ and the plate $w$ closing them.

In the boiler shown in Fig. 6 the small furnace $k$ is arranged above the large furnace $g$ and is separated from it by a partition which is also constituted by boiler-section parts $s$, through which circulates water. Between the section parts $s$ are again arranged slots $v'$, normally closed by a plate or damper $w'$, so that they can be opened by removing the said plate, when the combustion-gases from the large furnace $g$ will pass through the small furnace $k$.

There are no outer or adjoining furnaces; but they could be arranged, in which case the number of combinations between the different furnaces could be increased to a large extent.

Finally, the boiler shown in Fig. 7 is also provided with two superposed furnaces, of which the smaller one is at the top and open at the top, but is not separated from the bottom one by a partition. When the large furnace is used, either all the combustion-gases from the same are conveyed through the up and down flues $l$ and $m$, arranged between the sections, or admitted under the range-plate by means of the dampers $o$, or pass entirely or partly between the slots of the grate-bars $i$ under the range-plate $p$, so that the sections of the small grate $i$ become heating-bodies by means of which the combustion-gases of the large furnace are utilized.

As already stated, it is possible to combine in various manners the constructions illustrated, thus producing new forms, without departing from the spirit of this invention.

The special shape of the boiler-sections and the kind of furnaces, whether grate-furnaces or gas-furnaces, is immaterial. It is only necessary that there should be a boiler, consisting of separate sections, in which the separate parts of the furnace are portions of the boiler-sections.

What I claim is—

In a boiler, the combination, with a series of sections arranged side by side and provided with water-spaces connected by upper and lower cross-tubes $a$ and $b$, said section forming a main combustion-chamber $g$, upwardly-extending flues $l$, and downwardly-extending flues $m$; of an auxiliary combustion-chamber $k$ arranged above the level of the said combustion-chamber $g$, a range-plate arranged over both the said combustion-chambers, dampers at the upper ends of the flues $l$ and $m$ permitting the products of combustion to pass from said chamber $g$ to the range-plate, a damper arranged below the combustion-chamber $k$ and permitting the products of combustion to pass through the said chamber $k$ from the said combustion-chamber $g$, and a discharge-outlet for the products of combustion common to both of the said combustion-chambers.

In testimony whereof I affix my signature in presence of two witnesses.

ALOYS HAGE.

Witnesses:
 FLORENCE FULLER,
 EDMOND SHEPPARD.